United States Patent
Le Naour et al.

(10) Patent No.: US 7,039,371 B2
(45) Date of Patent: May 2, 2006

(54) TRANSMITTING DEVICE LIMITING THE OUT-OF-BAND INTERFERENCES

(75) Inventors: Jean-Yves Le Naour, Pace (FR);
Olivier Mocquard, Rennes (FR);
Dominique Lo Hine Tong, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 421 days.

(21) Appl. No.: 10/471,128

(22) PCT Filed: Feb. 27, 2002

(86) PCT No.: PCT/EP02/02078

§ 371 (c)(1),
(2), (4) Date: Sep. 8, 2003

(87) PCT Pub. No.: WO02/071635

PCT Pub. Date: Sep. 12, 2002

(65) Prior Publication Data
US 2004/0090364 A1    May 13, 2004

(30) Foreign Application Priority Data
Mar. 8, 2001    (FR) ................................ 01/03345

(51) Int. Cl.
*H04B 1/04* (2006.01)
(52) U.S. Cl. .................... 455/110; 455/114.2; 375/296
(58) Field of Classification Search ............... 455/108, 455/110, 112, 114.1, 114.2, 118, 205, 210; 375/295, 296, 300, 302
See application file for complete search history.

(56) References Cited

U.S. PATENT DOCUMENTS

| | | | |
|---|---|---|---|
| 5,509,028 A * | 4/1996 | Marque-Pucheu | 375/211 |
| 5,796,838 A | 8/1998 | Heerman | 380/38 |
| 6,118,984 A | 9/2000 | Yu-Hong | 455/76 |
| 6,434,401 B1 * | 8/2002 | Recouly | 455/553.1 |

FOREIGN PATENT DOCUMENTS

| | | |
|---|---|---|
| EP | 895363 | 2/1999 |
| JP | 1162740 A1 * | 12/2001 |
| WO | 01/45286 | 6/2001 |
| WO | 01/71929 | 9/2001 |

OTHER PUBLICATIONS

Copy of Search Report dated Jul. 4, 2002.

* cited by examiner

*Primary Examiner*—Quochien B. Vuong
(74) *Attorney, Agent, or Firm*—Joseph S. Tripoli; Robert D. Shedd; Brian J. Cromarty

(57) ABSTRACT

The invention relates to a transmitting device limiting the out-of-band interferences. The modulation is done with or without inversion of the spectrum. Next, frequency transposition is done in supradyne or infradyne fashion such that the parasitic effects originating from the modulation are always situated in the frequency band allocated for transmission. The invention relates to the transmission method, on the one hand, and to the transmission device, on the other hand.

7 Claims, 2 Drawing Sheets

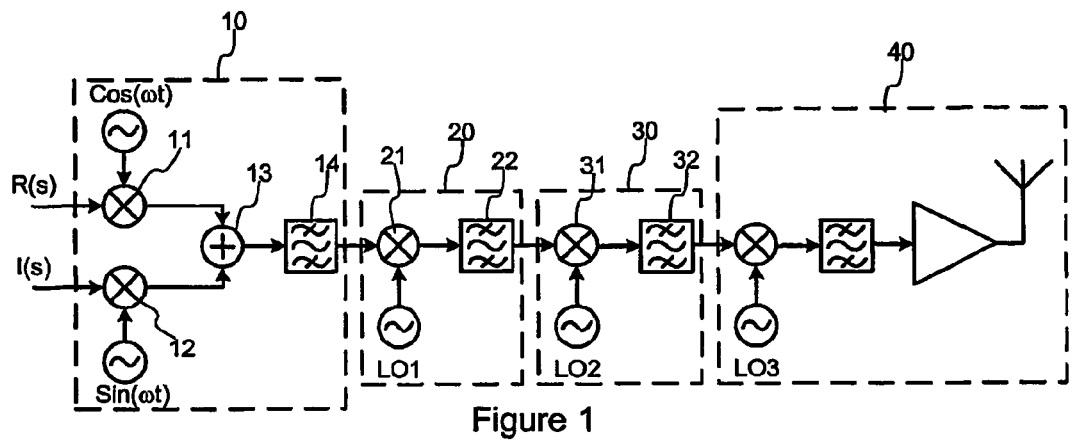
Figure 1
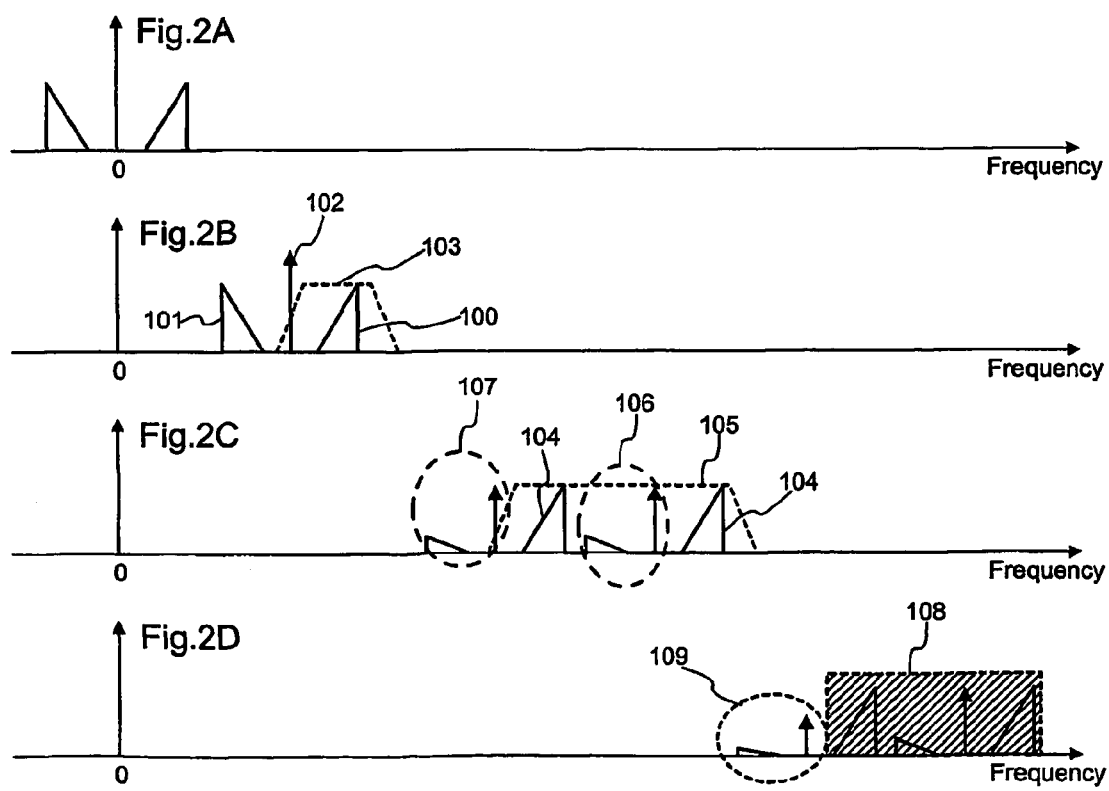

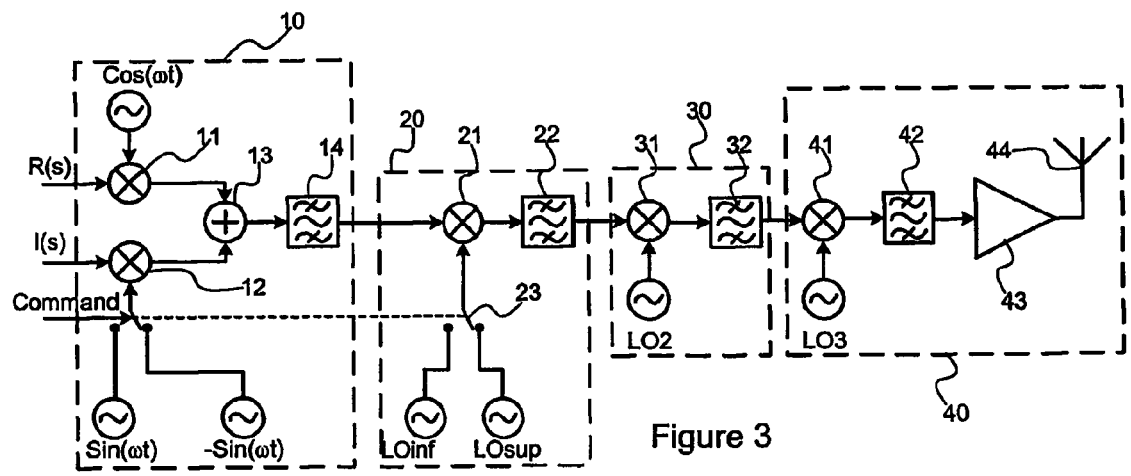
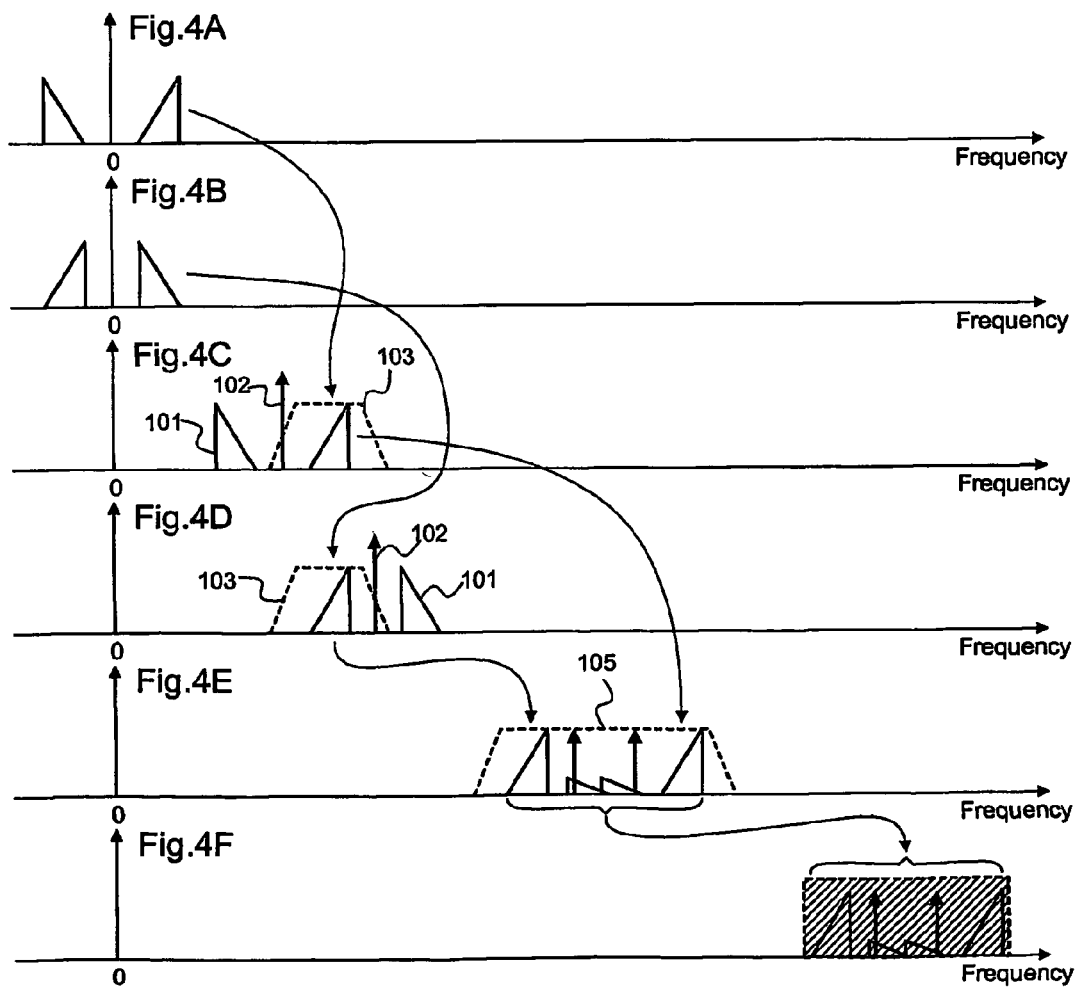

TRANSMITTING DEVICE LIMITING THE OUT-OF-BAND INTERFERENCES

This application claims the benefit, under 35 U.S.C. 365 of International Application PCT/EP02/02078, filed Feb. 27, 2002, which was published in accordance with PCT Article 21(2) on Sep. 12, 2002 in English and which claims the benefit of French patent application No. 0103345, filed Mar. 8, 2001.

BACKGROUND OF THE INVENTION

1. Technical Field

The invention relates to a transmitting device limiting out-of-band interferences.

Digital modulation is used more and more for satellite and terrestrial transmission. Several types of modulation are used, but they all consist in the transmission of symbols which are coded in terms of phase and of amplitude, possibly on several carriers.

2. Prior Art

In theory, it is possible to carry out direct modulation, that is to say to modulate the carrier frequency directly. However, the digital systems are generally placed in internal units which are not subjected to strong variations in temperature, whereas the antennae are placed outside at some distance. For this reason, an intermediate-frequency band, lower than the transmitting-frequency band, is generally used to form the link between the internal unit and the external unit, frequency transposition being carried out in the external unit.

Moreover, if a multi-channel type transmission system is used, it is necessary to have recourse to variable channel transposition when it is not possible to have frequency agility upon modulation. A frequency-transposition stage employing an oscillator makes it possible to provide the frequency agility.

Given the nature of the modulation, it proves simpler to carry out the modulation in digital mode. However, integrated circuits have operating limits, especially as regards digital/analog converters. In order to transmit a digital signal, it is known to have recourse to low-frequency modulation followed by a transposition to a higher frequency at which the conjugate image of the signal to be transmitted is eliminated more easily.

It is known, for example, to have recourse to a transmission path as represented in FIG. 1. The transmission path of FIG. 1 includes a first stage 10 carrying out modulation at "low" frequency, a second stage 20 serving for transposing the useful signal and filtering the image band of the signal to be transmitted, a third stage 30 producing the frequency agility, and a fourth stage 40 carrying out the transposition of the signal to the transmitting frequency.

As is known in prior art, a coding device, not represented, codes the data and supplies modulating signals R(s) and I(s) which correspond, for example, to a train of complex symbols to be transmitted. The modulation takes place, for example, according to a known technique by the use of two mixers 11 and 12 each receiving a modulating signal R(s) and I(s) and a signal of given frequency $\cos(\omega t)$ or $\sin(\omega t)$. An adder circuit 13 adds the signals originating from the mixers 11 and 12. A filter 14 keeps the useful part of the signal originating from the adder circuit 13. FIG. 2A shows the spectrum of the signal leaving the first stage 10. The first stage 10 is generally implemented by the use of a circuit which carries out the mixing, the adding and the filtering digitally. The signal is converted into analog at the output of the first stage 10 by the use of a converter, not represented. For reasons of scaling and of feasibility of the integrated circuit, modulation takes place at "low" frequency, that is to say that the modulated signal is, for example, below 50 MHz. Under such modulation conditions, it may happen that the useful band of the signal (which corresponds, for example, to a transmission channel) occupies a wide spectrum, for example 30 MHz, at low frequency, for example between 20 and 50 MHz.

The second stage 20 carries out frequency transposition and filtering which are for the purpose of shifting the useful band of the signal into higher frequencies. FIG. 2B represents the transposed useful band 100, the conjugate and transposed image 101 of the useful band, a spectral line 102 at the frequency of the local oscillator LO1 corresponding to a leakage from the mixer 21, and the template 103 of the filter 22 of the second stage 20. By way of example, if the frequency of the local oscillator LO1 is at 300 MHz, the useful band lies centred on 335 MHz between 320 and 350 MHz. The filter 22 has to reject the conjugate image 101 lying between 250 and 280 MHz and eliminate the spectral line 102 situated at 300 MHz. Such constraints on the filter 22 are very severe and difficult to achieve. Before filtering, the conjugate image 101 is substantially of the same power as the useful band 100 and the spectral line 102 generally remains present.

The third stage 30 implements the frequency agility by the use of a mixer 31, of a local oscillator LO2 of variable frequency and of a filter 32 which suppresses the image and harmonic frequencies of the transposition. FIG. 2C represents the extreme transpositions 104 of the useful band, the template 105 of the filter 32 and the parasitic transpositions 106 and 107 of the parasitic components 101 and 102. By way of example, the variable oscillator LO2 supplies a signal with frequency lying between 1.4 and 1.9 GHz so as to transpose the useful band into a range lying between 1.72 and 2.25 GHz. The template 105 is for the purpose of suppressing the image and harmonic frequencies situated outside this range. The parasitic transpositions 106 included in the range cannot be attenuated and the transmission system has to take them into account in order to minimize the impact on the quality of the transmission. The parasitic transpositions 107 lying outside the range are slightly attenuated since the filter 32 is a wideband filter which should not degrade the useful signal and since these parasitic transpositions 107 are very close to the useful signal.

The fourth stage 40 is generally situated close to the antenna and carries out the transposition into the transmission band, lying, for example, between 14 and 14.53 GHz, as well as the power amplification so as to transmit the signal. FIG. 2D represents the spectrum of the transmitted signal, the transmission band 108 and out-of-band interferences 109 transmitted when the useful band is transmitted at the limit of the transmission band.

The transmission bands are allocated by regulatory authorities. The regulatory authorities set the conditions for use of these bands, and especially the maximum noise level radiated outside the allocated band, in a very strict way, so as not to upset the users of adjacent bands. The parasitic effects 109 situated outside the band have to be below a threshold determined by the monitoring authorities. This threshold may be very low. The attenuation of the out-of-band interferences with respect to the useful signal is 60 dB, for example.

The person skilled in the art is confronted with several solutions for complying with the variable thresholds. A first solution consists in not using all of the allocated band, such that the part 111 lies in the allocated frequency band. A second solution consists in using high-rejection filters, which are very difficult to produce and which may distort the signal and degrade the performance of the transmission system. A third solution consists in carrying out the modulation at higher frequency, which amounts to spacing the image spectrum and the spectral line of the local oscillator away from the useful signal, but which dictates carrying out the modulation in analog mode, with the use of lower-performance discrete components.

SUMMARY OF THE INVENTION

The invention proposes to produce a modulation device making it possible, on the one hand, to use the whole of the allocated frequency band, without using filters with a high rejection ratio, making it possible to carry out the modulation at a relatively low frequency. According to the invention, modulation is done normally or with inversion of the spectrum. Next, a supradyne or infradyne frequency transposition is carried out, such that the parasitic effects arising from the modulation are always situated in the frequency band allocated for the transmission.

The invention is a method of transmitting data on at least one channel included in at least one authorized transmitting-frequency band. Depending on the position of the channel in the authorized transmitting-frequency band, either a first modulated signal is produced, corresponding to the modulation of a first frequency by the use of the data then the first modulated signal is transposed, in infradyne fashion, into a predetermined frequency band, or a second modulated signal is produced, the spectrum of which corresponds to the inverted spectrum of the first modulated signal, then the second modulated signal is transposed, in supradyne fashion, into the predetermined frequency band.

The terms "infradyne" and "supradyne" relate here to the signal resulting from the transposition. When a transposition is carried out in infradyne fashion, that means to say that the frequency of the local oscillator is less than the useful signal resulting from the transposition. When a transposition is carried out in supradyne fashion, that means to say that the frequency of the local oscillator is higher than the useful signal resulting from the transposition.

After the transposition, a filtering of the first or of the second modulated signal is preferably carried out, by the use of a filter the template of which corresponds to the predetermined frequency band.

The invention is also a device for transmitting data on at least one channel included in at least one authorized transmitting-frequency band, the device including means for producing a modulated signal on the basis of data to be transmitted, means for inverting or not inverting the spectrum of the modulated signal on the basis of the position of the channel in the authorized transmitting-frequency band, means for producing a signal for transposition to a first or to a second frequency, selection means for selecting one or other of the first and second frequencies on the basis of the position of the channel in the authorized transmitting-frequency band, and means for producing a transposed signal from the transposition signal and from the modulated signal.

BRIEF DESCRIPTION OF THE DRAWINGS

The device preferably includes filtering means for filtering the transposed signal.

The invention will be better understood, and other particular features and advantages will become apparent on reading the description which will follow, the description making reference to the attached drawings, among which:

FIG. 1 represents a transmitting device according to the state of the art,

FIG. 2 represents the various spectral positions occupied along the elements of the device of FIG. 1, FIG. 3 represents a transmitting device according to the invention, and FIG. 4 represents the various spectral positions occupied along the elements of the device of FIG. 3.

DETAILED DESCRIPTION OF A PREFERRED EMBODIMENT

The previously described FIGS. 1 and 2 will not be described in further detail. On the other hand, the same references will be used for similar elements carrying out the same function by comparison with the state of the art. For reasons of legibility, the spectral representations are not to scale.

FIG. 3 represents a preferred embodiment of a transmitting device according to the invention.

The transmitting device of FIG. 3 includes a first stage 10 carrying out modulation at "low" frequency, a second stage 20 to improve the filtering of the suite, a third frequency-excursion stage 30 and a fourth, transmitting stage 40.

The first stage carries out modulation in phase and in amplitude, also known by the name of constellation modulation. The data are coded in symbols by the use of a coding device of a known type which is not represented in FIG. 3. Each symbol corresponds to a complex number which modulates a carrier with frequency $\omega/2\pi$. The coding device supplies two modulating signals R(s) and I(s) which correspond to a train of complex symbols to be sent.

The modulation is carried out by the use of two mixers 11 and 12, each receiving a modulating signal R(s) and I(s). One of the mixers 11 receives a signal with frequency $\omega/2\pi$ and the other mixer 12 receives the same signal phase-shifted by plus or minus $\pi/2$ depending on a control signal. The fact of selecting the phase shift of plus or minus $\pi/2$ has the effect of making it possible to invert or not invert the spectrum of the modulated signal with respect to the frequency $\omega/2\pi$. An adder circuit 13 adds the signals originating from the mixers 11 and 12, and a filter 14 keeps only the useful part of the signal originating from the adder circuit 13. FIG. 4A shows the spectrum of the signal leaving the first stage 10 when modulation is carried out with a phase shift of $+\pi/2$. FIG. 4B shows the spectrum of the signal leaving the first stage 10 when modulation is carried out with a phase shift of $-\pi/2$.

In one preferred example, the first stage 10 is implemented by the use of a circuit which carries out the mixing, the addition and the filtering in digital mode, the signal being converted to analog at the output of the first stage 10. The mixing takes place in digital mode by multiplying two trains of data. The selection of the phase shift of plus or minus $\pi/2$ is done very simply either by selecting one train of data from two or by carrying out multiplication by $-1$. In such a case, the filter 14 can be formed by the analog/digital conversion device.

The second stage 20 carries out frequency transposition and filtering which are for the purpose of shifting the signal modulated by the stage 10 into higher frequencies. A mixer 21 receives the modulated signal, on the one hand, and a transposition signal, on the other hand. The transposition signal can have two frequency values. In the preferred example, a changeover switch 23 selects one oscillator between oscillators LOinf and LOsup. A filter 22 will keep a frequency band corresponding to the useful band of the modulated signal after the transposition. The template 103 of the filter is determined so as to let through a spectrum with the width of the modulated signal. The frequency of the oscillator LOinf is determined in such a way that the transposition of the modulated signal by the use of the oscillator LOinf brings the positive part of the modulated signal into the template 103 of the filter 22, which corresponds to a transposition of infradyne type. The frequency of the oscillator LOsup is determined in such a way that the transposition of the modulated signal by the use of the oscillator LOsup brings the negative part of the modulated signal into the template 103 of the filter 22, which corresponds to a transposition of supradyne type. It is convenient for the central frequency of the modulated signal after the transposition in infradyne or supradyne fashion to be placed at the same spot in the template 103 of the filter 22.

The changeover switch 23 receives the control signal so as to carry out an infradyne transposition when the modulation is done with a signal phase shifted by $+\pi/2$, and to carry out supradyne modulation when the modulation is done with a signal phase shifted by $-\pi/2$. FIG. 4C represents the transposition carried out with the modulated signal of FIG. 4A, and FIG. 4D represents the transposition carried out with the modulated signal of FIG. 4B. The person skilled in the art may notice that, after the transposition carried out by the mixer 21, the useful signal placed in the template 103 is the same independently of the modulation performed. In contrast, the spectral line 102 due to the leakage from the mixer 21 and the conjugate image 101 of the useful signal lie on different edges of the template 103.

The third stage 30 implements the frequency agility by the use of a mixer 31, a variable-frequency oscillator LO2 and a filter 32 which suppresses the image and harmonic frequencies of the transposition. The frequency offset between the useful signal and the zero frequency is much larger at the output of the second stage 20 than at the output of the first stage 10. That being so, the leakages from the mixer 31 as well as all the images resulting from the transposition carried out by the mixer 31 are sufficiently far removed from the edges of the template 105 of the filter 32 to be correctly rejected without requiring substantial constraints on the filter 32. In order to avoid having parasitic effects resulting from the transposition of the second stage 20 on the edges of the template 105, it is convenient to have carried out a supradyne transposition when the useful signal lies back in the lower part of the template 105 and to have carried out an infradyne transposition when the useful signal lies back in the upper part of the template 105. All the parasitic effects resulting from the transposition of the second stage 20 are found placed within the template 105. FIG. 4E represents the extreme cases of transposition.

The fourth stage 40 includes a mixer 41, a filter 42, a power amplifier 43 and an antenna 44. The mixer 41 transposes the signal leaving the third stage 30 into the transmitting-frequency band. The filter 42 eliminates the image frequencies of the transposition. FIG. 4F shows the possible spectrum of the transmission signal. As the person skilled in the art may observe, there are no longer any out-of-band interferences in proximity to the edges of the band.

With the invention, the out-of-band interferences are brought back within the transmission band. As the person skilled in the art knows, the level of the parasitic effects authorized within the transmission-frequency band may have a level much higher than the level of the out-of-band parasitic effects. It is then possible to produce the filter 22 with constraints which are lower than those necessary with the circuit of the state of the art, while guaranteeing a lower level of out-of-band interferences.

Numerous variants of the invention are possible. The example described represents a four-stage device. It goes without saying that the addition or the removal of one or more stages is possible.

The frequency excursion of the third stage can be carried out directly in the fourth stage in order to reduce the number of components of the transmitting path.

It is also possible to perform the frequency excursion partially in the coding circuit according to a known technique. The modulating signals R(s) and I(s) are then representative of a digital modulation instead of being representative of a symbol. In this case, it is possible to use a dual-frequency oscillator or two oscillators switched over in place of the oscillator of the third stage.

The invention is particularly suitable for the digital modulations using wide bands, for example of CDMA type or of multi-carrier type. The modulating signals R(s) and I(s) are then representative of a modulation sum at various frequencies.

However, it should be noted that the spectrum should be inverted on itself; that is not possible with the diagram of FIG. 3, unless complex modulation of the central frequency of the useful band is carried out. If modulation is carried out on a frequency which is not central, it is advisable to modulate in one case with the frequency which is wanted and in the other case with a frequency corresponding to the frequency which is symmetric with respect to the central frequency of the useful band.

The invention claimed is:

1. Method of transmitting data on at least one channel included in at least one authorized transmitting-frequency band, wherein, depending on the position of the channel in the authorized transmitting-frequency band,
   either a first modulated signal is produced, corresponding to a modulation of a first frequency by the use of the data, then the first modulated signal is transposed, in infradyne fashion, into a predetermined frequency band,
   or a second modulated signal is produced, the spectrum of which corresponds to the inverted spectrum of the first modulated signal, then the second modulated signal is transposed, in supradyne fashion, into the predetermined frequency band.

2. Method according to claim 1, wherein, after the transposition, a filtering of the first or of the second modulated signal is carried out, by the use of a filter the template of which corresponds to the predetermined frequency band.

3. Method according to claim 2, wherein, after the filtering, at least one frequency transposition of the filtered signal is carried out.

4. Device for transmitting data on at least one channel included in at least one authorized transmitting-frequency band, wherein said device includes:
   means for producing a modulated signal on the basis of data to be transmitted, means for inverting or not inverting the spectrum of the modulated signal on the basis of the position of the channel in the authorized transmitting-frequency band, means for producing a signal for transposition to a first or to a second frequency, selection means for selecting one or other of the first and second frequencies on the basis of the position of the channel in the authorized transmitting-frequency band, means for producing a transposed signal from the transposition signal and from the modulated signal.

5. Device according to claim 4, wherein said device includes filtering means for filtering the transposed signal.

6. Device according to claim 5, wherein said device includes means for producing a transmission signal situated in a transmission band on the basis of the transposed signal.

7. Device according to claim 6, wherein said device includes means for transmitting the transmission signal.

* * * * *